United States Patent
Kelly

(10) Patent No.: US 6,329,475 B1
(45) Date of Patent: Dec. 11, 2001

(54) CURABLE EPOXY VINYLESTER COMPOSITION HAVING A LOW PEAK EXOTHERM DURING CURE

(75) Inventor: Paul Patrick Kelly, Herrlisheim (FR)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 08/382,028

(22) PCT Filed: Aug. 2, 1993

(86) PCT No.: PCT/US93/07238

§ 371 Date: Feb. 10, 1995

§ 102(e) Date: Feb. 10, 1995

(87) PCT Pub. No.: WO94/04583

PCT Pub. Date: Mar. 3, 1994

(30) Foreign Application Priority Data

Aug. 12, 1992 (GB) ................................................ 92170056

(51) Int. Cl.$^7$ .................................................. C08F 283/00
(52) U.S. Cl. ........................ 525/531; 525/529; 525/530; 525/533; 525/922; 523/442
(58) Field of Search ..................... 525/531, 529, 525/530, 533, 922; 523/442

(56) References Cited

U.S. PATENT DOCUMENTS

| | | |
|---|---|---|
| 3,437,715 | 4/1969 | Da Fano . |
| 3,819,551 * | 6/1974 | Hokamura et al. .................. 524/168 |
| 3,882,187 * | 5/1975 | Takiyama et al. ................... 525/631 |
| 4,143,090 * | 3/1979 | Vargiu et al. ........................ 525/531 |
| 4,259,228 | 3/1981 | Smearing . |
| 4,309,511 | 1/1982 | Jefferson et al. . |
| 4,575,478 * | 3/1986 | Ohno ..................................... 430/109 |
| 4,659,380 * | 4/1987 | Winters et al. .................... 106/14.14 |
| 4,847,337 | 7/1989 | Hefner, Jr. . |
| 4,888,269 * | 12/1989 | Sato et al. ............................ 430/280 |
| 5,001,168 * | 3/1991 | Fuji et al. ............................... 525/25 |
| 5,262,232 * | 11/1993 | Wilfong et al. ...................... 428/327 |

FOREIGN PATENT DOCUMENTS

| | | |
|---|---|---|
| 0043484 | 6/1981 | (EP) . |
| 505490 | 1/1975 | (JP) . |
| 52051489 | 4/1977 | (JP) . |
| 52086490 | 7/1977 | (JP) . |
| 54041987 | 4/1979 | (JP) . |
| 5734606 | 2/1982 | (JP) . |
| 57147509 | 9/1982 | (JP) . |
| 58191708 | 11/1983 | (JP) . |
| 59131614 | 7/1984 | (JP) . |
| 59131615 | 7/1984 | (JP) . |

\* cited by examiner

Primary Examiner—Randy Gulakowski

(57) ABSTRACT

The invention is a curable resin composition comprising A) an epoxy vinylester resin or a polyester resin; B) a polymerizable monomer; C) a chelating agent; and D) a copper salt or complex of copper with an alcohol, aldehyde or ketone; and E) an inhibitor comprising alkylated phenolic compound or polyhydroxy aromatic compound. In another aspect it is a resin system comprising I) a resin composition comprising: A) an epoxy vinylester resin or a polyester resin; B) a polymerizable monomer; C) a chelating agent comprising a polar or aromatic ring containing compound; D) a copper salt or a copper complex with an alcohol, ketone or aldehyde; and E) an inhibitor comprising alkylated phenolic compound or a polyhydroxy aromatic hydrocarbon and I) a catalyst system which comprises E) an additional amount of an inhibitor; F) optionally an aliphatic amine, an aromatic amine, or a heterocyclic amine; G) a peroxide or persulphate initiator; and H) a transition metal accelerator. In another embodiment the invention is a method of curing a curable resin composition which comprises contacting the resin composition (I) with a catalytic amount of the catalyst composition (II) optionally contacting the mixture with a reinforcing structure and allowing the composition to cure; under conditions such that the peak exotherm 100 grams of the reaction mass is from 40° C. to 120° C. and the cure time is from 30 to 120 minutes.

9 Claims, No Drawings

CURABLE EPOXY VINYLESTER COMPOSITION HAVING A LOW PEAK EXOTHERM DURING CURE

The invention relates to a curable epoxy vinylester or polyester composition which cures with a low peak exotherm within commercially acceptable processing times. The invention further relates to a method of curing an epoxy vinylester resin or polyester resin composition under conditions such that the resin cures with a low peak exotherm in a few hours or less.

Epoxy vinylester resins and polyester resins are well-known in the art. Such resins are useful as the continuous matrix in composite applications, and in the fabrication of molded parts. The resins suffer from the problem that during cure an exothermic reaction occurs leading to a high peak exotherm. When used to make thick or large parts or laminates the high peak exotherm can cause serious problems in that thermal stress induced in the structure causes it to crack.

Japanese Patent Application 5 2051,489 discloses curing of unsaturated polyester resins with an organic peroxide in the presence of an organo metallic compound, alicyclic beta diketones and an amine. It is disclosed that the composition improves the curing speed and that the products are hardly discolored with good workability.

U.S. Pat. No. 4,309,511 discloses curing an unsaturated polyester resin composition which contains an unsaturated comonomer. The claimed improvement is the use of a cure promoter comprising a cobalt salt, a copper salt and a heterocyclic amine. It is disclosed that the cure promoter provides a very fast accelerator system when used in conjunction with peroxide to give cure times of 5 to 15 minutes and that in the uncatalyzed state the resin has a shelf life of 80 to 150 days. It is further disclosed that little or no color is imparted to the resin.

What is needed is a curable epoxy vinylester resin or polyester resin composition that cures within reasonable times at low peak exotherms. What is further needed is a method of curing epoxy vinylester compositions and polyester compositions wherein the peak exotherm of the cure cycle is low and the time period for cure is short enough to facilitate reasonable productivity but not so short as to render the composition unhandleable, for example between 0.5 to 2.0 hours.

In a first aspect, the invention provides a curable resin composition comprising
A. an epoxy vinylester resin or a polyester resin;
B. a polymerizable monomer;
C. a chelating agent;
D. a copper salt or complex of copper with an alcohol, aldehyde or ketone; and
E. an inhibitor which is an alkylated phenolic compound or polyhydroxy aromatic compound.

In another aspect the invention is a two part curable composition comprising
I. A resin composition comprising
A. an epoxy vinylester resin or a polyester resin;
B. a polymerizable monomer;
C. a chelating agent comprising a compound containing a polar function or an aromatic ring;
D. a copper salt or a complex of copper with an alcohol, ketone or aldehyde; and
E. an inhibitor comprising an alkylated phenolic compound or polyhydroxy aromatic hydrocarbon; and II. A catalyst system which comprises
E. optionally, an additional amount of the inhibitor;
F. optionally an aliphatic amine, a heterocyclic amine or an aromatic amine;
G. a peroxide or persulphate initiator; and
H. a transition metal accelerator.

In another aspect the invention is a method of curing the resin composition which comprises contacting the resin composition (I) with a catalytic amount of catalyst system (II); optionally contacting the mixture with a reinforcing structure, and allowing the mixture to cure under condition such that the peak exotherm is from 40° C. to 120° C. and the cure time is from 30 to 120 minutes.

In another aspect the invention is the use of a copper salt or copper complex with an alcohol, aldehyde or ketone; combined with a chelating agent and an inhibitor comprising an alkylated phenolic compound or polyhydroxy aromatic hydrocarbon to cure an epoxy vinylester resin or a polyester resin composition.

The curable composition and method for curing such curable composition claimed herein allows for the preparation of thick structures and large parts using polyester or epoxy vinylester resins without damage due to overheating of the reaction mass. The composition and method of invention allows controllable curing of large or thick parts such that good quality products are made.

The epoxy vinylester resins that can be employed in the composition of the present invention may be prepared (1) by reacting a polyepoxide with an ethylenically unsaturated carboxylic acid to produce a reaction product which contains, in part, the functional group

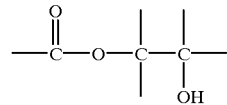

produced by the interaction of an epoxide group with a carboxylic acid group, or (2) by further condensation of the secondary hydroxyl groups contained in the above reaction product with a dicarboxylic acid anhydride to produce pendant half ester groups. The resulting epoxy vinylester resins can then be admixed with a polymerizable monomer containing a >C=CH$_2$ group. In the first stage of the resin preparation, the polyepoxide is preferably added in an amount sufficient to provide from 0.8 to 1.2 equivalents of epoxide per equivalent of carboxylic acid. If desired, the further condensation of the secondary hydroxyl groups is completed by the addition of a dicarboxylic acid anhydride to form pendant half ester groups with the secondary alcohol group generated from the epoxide-carboxylic acid reaction. The proportion of this added dicarboxylic acid anhydride can be varied to convert any or all of the secondary hydroxyl groups to pendant half ester groups.

Ethylenically unsaturated carboxylic acids that are preferable for reaction with the polyepoxide include the α,β-unsaturated monocarboxylic acids and the hydroxyalkyl acrylate or methacrylate half esters of dicarboxylic acids. The α,β-unsaturated monocarboxylic acids include such acids as acrylic acid, methacrylic acid, crotonic acid and cinnamic acid. The hydroxyalkyl group of the acrylate or methacrylate half esters preferably contains from two to six carbon atoms and may be, for example, hydroxyethyl, beta-hydroxy-propyl or beta-hydroxybutyl. The hydroxyalkyl group may also include an ether oxygen. The dicarboxylic acids can be either saturated or unsaturated in nature. Saturated acids include phthalic acid, chlorendic acid, tetrabromophthalic acid, adipic acid, succinic acid and glutaric acid. Unsaturated dicarboxylic acids include maleic acid, fumaric acid, citraconic acids, itaconic acid, halogenated maleic or fumaric acids and mesaconic acid. Mixtures of saturated and ethylenically unsaturated dicarboxylic acids can be employed.

The half esters preferably employed are prepared by reacting substantially equal molar proportions of a hydroxyalkyl acrylate or methacrylate with a dicarboxylic acid anhydride. Other unsaturated anhydrides that can be employed include maleic anhydride, citraconic anhydride and itaconic anhydride; preferred saturated anhydrides that can be employed include phthalic anhydride, tetrabromophthalic anhydride and chlorendic anhydride. Advantageously, a polymerization inhibitor, such as the methyl ether of hydroquinone or hydroquinone, may be added inasmuch as elevated temperatures are useful in preparing the half esters.

Any of the known polyepoxides can be employed in the preparation of the epoxy vinylester resins. Preferred polyepoxides are glycidyl polyethers of polyhydric alcohols, polyhydric phenols, epoxy novoiacs, elastomer modified epoxides, halogenated epoxides, epoxidized fatty acids or drying oil acids, epoxidized diolefins, epoxidized di-unsaturated acid esters, epoxidized unsaturated polyesters and mixtures thereof, as long as they contain more than one epoxide group per molecule. The polyepoxides may be monomeric or polymeric in nature. Preferred polyepoxides include glycidyl polyethers of polyhydric alcohols or polyhydric phenols, having weights per epoxide group (EEW) of 150 to 2,000. These polyepoxides are usually made by reacting at least two moles of an epihalohydrin or glycerol dihalohydrin with one mole of the polyhydric phenol and a sufficient amount of caustic alkali to combine with the halogen of the halohydrin. The products are characterized by the presence of more than one epoxide group per mole on average, i.e. a 1,2-epoxy equivalency greater than one.

Preferable dicarboxylic acid anhydrides for reaction with the secondary hyroxyl groups include both the saturated anhydrides, such as phthalic anhydride, tetra-bromophthalic anhydride and chlorendic anhydride, and the α,β-unsaturated dicarboxylic acid anhydrides, such as maleic anhydride, citraconic anhydride and itaconic anhydride.

The polymerizable monomer may be any monomer which polymerizes with the epoxy vinylester resins or polyester resins. Preferably, the polymerizable monomer contains ethylenic unsaturation. A wide selection of polymerizable monomers containing a >C=CH$_2$ group is available from the many known classes of vinyl monomers. Preferred polymerizable monomers are styrene, o-methyl styrene, m-methyl styrene, p-methyl styrene, ortho-, meta-, and parahalostyrenes, vinyl naphthalene, the various alpha-substituted styrenes, as well as the various di-, tri- and tetra-halostyrenes and acrylic, methacrylic and crotonic acid esters, which include both the saturated alcohol esters and the hydroxyalkyl esters or mixtures thereof. Styrene is the preferred copolymerizable monomer. Generally, the polymerizable monomer is present in amounts ranging from 20 to 60 weight percent of the vinylester resin composition depending upon the particular properties desired.

In the preparation of the epoxy vinylester resins, various inhibitors and catalysts may be used. Any of the well-known vinyl polymerization inhibitors, such as hydroquinone or the methyl ether of hydroquinone, can be used. Additionally, the reaction of the polyepoxide with the carboxylic acid may be conducted either in the presence or absence of a catalyst such as alcoholates and tertiary-amino phenols.

Preferred epoxy vinylester resins which may be employed in the practice of the present invention are those supplied by The Dow Chemical Company under the trademark DERAKANE. Particularly preferred is the general purpose resin known as DERAKANE 411-45 epoxy vinylester resin, which contains approximately 45 percent monomeric styrene. Other DERAKANE epoxy vinylester resins that can be employed, for example, include: DERAKANE 411-C-50 epoxy vinylester resin, containing approximately 50 percent monomeric styrene; DERAKANE 470-36 epoxy vinylester resin, containing approximately 36 percent monomeric styrene; DERAKANE 470-30 epoxy vinylester resin, containing approximately 30 percent monomer styrene; DERAKANE 510-A-40 epoxy vinylester resin, a brominated vinylester resin containing approximately 40 percent monomeric styrene; DERAKANE 790 epoxy vinylester resin, containing approximately 45 percent monomer styrene; and DERAKANE 8084 epoxy vinylester resin, a flexibilized epoxy vinylester resin containing approximately 40 percent monomeric styrene.

Unsaturated polyester resins used in reinforced plastics are well-known to the art and are prepared by reacting unsaturated dibasic acids with dihydric alcohols and dissolving the resulting mixture in a reactive solvent. The unsaturated dibasic acids or acid anhydrides preferably employed are dicarboxylic acids or anhydrides, such as for example, phthalic acid, phthalic anhydride, terephthalic acid, adipic acid, succinic acid, mellitic acid, tetrahydrophthalic anhydride, fumaric acid, citraconic, itaconic acids, and nadic anhydride. Typical polyhydric alcohols that may be employed include glycols and glycol ethers such as ethylene glycol, propylene glycol, butylene glycol, diethylene glycol, dipropylene glycol, polyethylene glycol and polypropylene glycol.

Other unsaturated polyester resins which may be employed in the practice of this invention include reaction products of monoethylenically unsaturated carboxylic acids with diols or diol precursors, such as bisphenol-A or bisphenol-A diglycidyl ethers. In general, the unsaturated polyester resins are combined with a polymerizable monomer to form a low viscosity resin. The polymerizable monomer preferably comprises a copolymerizable ethylenically unsaturated monomer, more preferably styrene. Other polymerizable monomers which can be employed include o-methyl styrene, m-methyl styrene, p-methyl styrene, divinyl benzene, alpha methyl styrene, orthochloro styrene, acrylic acid, methacrylic acid, maleate esters, acrylic esters and methacrylic esters, and mixtures thereof. Preferably, polyester resins containing from 25 to 55 percent by weight of styrene and from 45 to 75 percent by weight of unsaturated polyester resin are favorably employed. The preferred unsaturated polyester resins employed in the practice include isophthalic polyester resins containing styrene as the copolymerizable monomer. A ratio of 1 part by weight of styrene to 2 parts by weight of resin is preferably utilized.

An additional component of the resin composition is a chelating agent which contains a functionality capable of forming a coordination compound with metals. The chelating agent preferably contains a polar function or an aromatic function and must be capable of selectively complexing with the metals in the reaction mixture to form a coordination complex. The chelating agent preferably contains a carbonyl moiety, an aromatic ring, a triple bond, such as acetylene, or a triaryl phosphine, such as triphenyl phosphine. Examples of aromatic ring containing compounds useful include benzene, cyclopentadiene, terpyridine, bipyridine, cyclooctadienes, norbornadienes and xylene. Examples of carbonyl-containing compounds include acetyl acetone, carbon dioxide and carbon monoxide. The chelating agent is present in a sufficient amount to increase the reaction time for the curing reaction. It is believed that the chelating agent forms a complex with some or all of the metal salts present which results in temporarily retarding the catalytic activity of the metals. The chelant is preferably present in the reaction mixture in amounts of 100 parts per million by weight or greater, more preferably 500 parts per million by weight or greater and most preferably 1000 parts per million by weight or greater. The chelating agent is preferably present in an amount of 10,000 parts per million by weight or less, more preferably 3000 parts per million by weight or less and most preferably 2500 parts per million by weight or less.

A key ingredient of the composition is the copper salt or copper complex with an alcohol, ketone or aldehyde. Preferred copper salts are the salts of organic acids, more preferably salts of carboxylic acids, even more preferably salts of $C_{6-20}$ carboxylic acids and most preferably salts of $C_{8-16}$ carboxylic acids. The most preferred carboxylic acids are octanoic acid and naphthenoic acid. The copper salt or copper complex is generally introduced in solution. Examples of useful solvents include aromatic hydrocarbons, for example xylene, toluene and benzene. The copper salt or copper complex is used in a sufficient amount to control the peak exotherm, preferably to a level of from 40° C. to 120° C. for a 100 g mass of resin. Preferably the copper salt or copper complex is present at a level of 5 ppm by weight or greater, more preferably 10 ppm by weight or greater, even more preferably 100 ppm by weight or greater and most preferably 200 ppm by weight or greater. Preferably the copper salt or copper complex is present in an amount of 1000 ppm by weight or less, most preferably 800 ppm by weight or less and most preferably 600 ppm by weight or less.

Also present is an inhibitor which comprises an alkylated phenolic compound or a polyhydroxy aromatic compound. It is believed that such inhibitor primarily works by reacting with the radical generated by the peroxide to form a more stable radical thereby influencing the rate of generation of reactive radicals to catalyze the free radical polymerization. This influences the reactivity providing an ability to control the gel time. Inhibitors include alkyl substituted phenolic compounds; such as alkyl substituted catechols, alkyl substituted hydroquinones, alkyl substituted phenol and alkyl substituted bisphenols. A second class of inhibitors include the polyhydroxy aromatic compounds which are compounds containing one or more aromatic rings with two or more hydroxy groups bound to aromatic rings. Preferred are polyhydroxy aromatic compounds or compounds where the aromatic ring is a benzene ring and include those compounds which contain two or more benzene rings which are connected by a direct bond or bridging moiety such as an alkylene or substituted alkylene moiety. Examples of such compounds include hydroquinone and bisphenol A. Among preferred inhibitors are tertiary butyl catechol, butylated hydroxy toluene, octyl phenol, bisphenol and mixtures thereof. The most preferred inhibitor is tertiary butyl catechol. The inhibitor is used in a sufficient amount to give the desired gel time, preferably a gel time of 120 minutes or less. The inhibitor is preferably used in an amount of 10 parts per million by weight or more by weight based on the amount of epoxy vinylester resin or polyester resin and polymerizable monomer present, more preferably 100 parts per million by weight or greater. The inhibitor is preferably used in an amount of 1000 parts per million by weight or less, and more preferably 500 parts per million by weight or less. The inhibitor is present in the resin composition (I) and an additional amount may be present in the catalyst composition (II). Preferably a portion of it is present in the catalyst composition (II).

The catalyst composition preferably comprises a peroxide or persulfate initiator, a transition metal accelerator and optionally an amine inhibitor. Such compositions are well-known in the art. The initiator is preferably an alkali metal persulfate or an organic peroxide. Preferably organic peroxides are the ketone peroxides, dioxyalkyl peroxides and the diacyl peroxides. Examples of initiators include benzoyl peroxide, lauryl peroxide, t-butyl hydroperoxide, t-butyl perbenzoate, methyl ethyl ketone peroxide, cyclohexanone peroxide, t-butyl peroxy benzoate, dibenzoyl peroxide, cumene hydroperoxide and potassium persulfate. The initiator is present in an amount which allows the resin to react or polymerize at ambient temperatures. The initiator is used preferably in an amount of 1000 parts per million by weight or greater, preferably 5000 parts per million by weight or greater. The initiator is preferably used in an amount of 50,000 parts per million by weight or less, more preferably 20,000 parts per million by weight or less.

The accelerator is used to speed up the reaction. Such accelerators are preferably transition metal salts and more preferably salts of organic acids. The preferred transition metals are cobalt and vanadium, with cobalt being most preferred. Preferred are the cobalt salts of $C_{2-20}$ carboxylic acids, with cobalt salts of $C_{8-16}$ carboxylic acids being more preferred. The most preferred accelerators are cobalt naphthenate and cobalt octoate. The transition metal salts are present in a sufficient amount to provide a transition metal concentration which accelerates the break down of the peroxide initiator. The transition metal salts are preferably present in amounts of 30 parts per million by weight or greater, and more preferably 60 parts per million by weight or greater. The transition metal salt accelerators are preferably present in an amount of 1000 parts per million by weight or less and more preferably 300 parts per million by weight or less.

An optional component of the catalyst composition is an amine inhibitor which is capable of ensuring the long-term reactivity of the system. The amines useful in the catalyst composition are well-known in the art. Included among classes of useful amines are the aliphatic amines, aromatic amines and heterocyclic amines. The preferred heterocyclic amines include pyrrole, imidazole, oxazole, thiazole, pyrazole, pyrazoline, pyrrolidine, pyridine, pyrimidine, purine and quinoline. The preferred aromatic and aliphatic amines include dimethylaniline, diethylaniline, aniline, toluidine, dimethyl aceto acetamide, ethylene diamine and diethylene tetraamine. The amine is present in a sufficient amount to maintain the reactivity for 120 days, preferably 6 months. Preferably, the amine is present in an amount from 0 parts per million by weight or greater and more preferably 500 parts per million by weight or greater. The amine is preferably present in an amount of 50,000 parts per million by weight or less, preferably 5000 parts per million by weight or less.

In addition to the ingredients hereinabove recited, the curable composition may contain small but effective quantities of thixotropic agents such as fumed silica and modified fumed silica, carboxy cellulose; pigments; inert fillers such as silica, calcium carbonate, titanium dioxide, magnesium oxide; and fibrous reinforcing material such as randomly oriented glass fibers or woven glass fabrics.

The curable composition of this invention may be cured by first contacting together the components of the resin composition (I), in particular the epoxy vinylester resin or polyester resin, polymerizable monomer, the chelating agent, the copper salt or copper complex and the inhibitor, then contacting the resin composition with the catalyst composition (II). Thereafter, if desired, the curable composition is formed into a desired shape or brought into contact with a reinforcing structure. Such reinforcing structures can be any structures well-known in the art and can include long or short fibers and fiber mats. Thereafter the composition is allowed to cure. The peak exotherm of the reaction mass during the reaction is preferably 40° C. or greater and more preferably 60° C. or greater. Preferably the peak exotherm is 120° C. or less and more preferably 90° C. or less. Preferably the reaction mass cures in 30 minutes or greater, more preferably 50 minutes or greater. Preferably the reaction mass cures in 120 minutes or less and more preferably 70 minutes or less. The cured masses have a high heat distortion temperature, preferably such heat distortion temperature is 50° C. or greater, more preferably 80° C. or greater, and most preferably 100° C. or greater. Such cured reaction masses have a glass transition temperature of 60° C. or greater, more preferably 90° C. or greater. An additional benefit of the process of this invention is that the products have a low residual styrene level, more preferably 10 percent by weight or less. Such residual styrene level is 15 percent by weight or less after 16 hours at room temperature cure or of 2 percent by weight or less after 3 hours cure at 80° C.

The resin system of the invention allows the fabrication of parts having a thickness of 15 mm or greater and preferably 20 mm or greater in one operation. Known resin systems usually require the build-up of separate 5 mm layers in separate operations.

The following examples are provided to illustrate the invention and are not intended to limit the scope of the claims. Unless otherwise stated all parts and percentages are by weight.

COMPARATIVE EXAMPLES 1–10

In comparative Examples 1–10 the listed components are contacted and allowed to react. The gel time is measured in minutes, the time to peak exotherm and the temperature at peak exotherm are determined according to the following procedure.

All the ingredients except the initiator were introduced into a four ounce wide-mouth bottle and the contents were shaken or agitated until complete mixing was obtained. The bottle containing the mixture was placed into a water bath having a temperature of 77° F. (25° C.) and maintained until the temperature of the mixture was 77° F. (25° C.). The bottle was removed from the bath and the initiator of methyl ethyl ketone peroxide, 50 percent by weight in a phthalate ester, (MEKP) (1.5 parts) was added to the mixture. The time of a gelometer was started. The gelometer was fitted with a timer, an automatic shut-off and a rotary paddle (0.5 to 1.0 inch in width and 1 inch high). The MEKP was mixed into the mixture quickly with a spatula. The bottle containing the mixture was placed on the gelometer with the paddle depth midway in the resin. A second timer was started when the resin gels and the bottle was removed from the gelometer. A thermometer was placed in the gelled resin with the tip in the center of the resin mixture mass. The second timer was stopped when the maximum temperature is reached. The results for comparative Examples 1 to 10 are recorded in Table 1. The components are measured in parts by weight.

TABLE 1

| Component/Example | 1 | 2 | 3 | 4 | 5 | 6 | 7 | 8 | 9 | 10 |
|---|---|---|---|---|---|---|---|---|---|---|
| DERAKANE* 411-4 resin | 100 | 100 | 100 | 100 | 100 | — | — | — | — | — |
| DERAKANE* 470-30 resin | — | — | — | — | — | 100 | 100 | 100 | 100 | 100 |
| Cobalt solution (pHr) | 0.2 | 0.2 | 0.2 | 0.2 | 0.2 | 0.3 | 0.3 | 0.3 | 0.3 | 0.3 |
| DMA solution (pHr) | 1.2 | 1.2 | 1.2 | 1.2 | 1.2 | 1.0 | 1.0 | 1.0 | 1.0 | 1.0 |
| Copper solution[3] | 0.2 | 0.2 | 0.2 | 0.2 | 0.2 | 0.65 | 0.65 | 0.65 | 0.65 | 0.65 |
| Acetyl acetone | 0.0 | 0.1 | 0.2 | 0 | 0 | 0 | 0.1 | 0.2 | 0 | 0 |
| Tert butyl catechol[4] (pHr) | 0 | 0 | 0 | 0.25 | 0.50 | 0 | 0 | 0 | 0.25 | 0.50 |
| Methyl ethyl ketone peroxide[5] (pHr) | 1.5 | 1.5 | 1.5 | 1.5 | 1.5 | 1.5 | 1.5 | 1.5 | 1.5 | 1.5 |
| RESULTS | | | | | | | | | | |
| Gel time (min) | 26 | 78 | 106 | 47 | 43 | 21 | 39 | 126 | 40 | 67 |
| Time to peak (min) | 42 | 120 | 125 | 38 | 72 | 33 | 50 | 174 | 56 | 100 |
| Temperature peak (° C.) | 41 | 48 | 99 | 40 | 34 | 55 | 59 | 87 | 44 | 30 |

\* Trademark of The Dow Chemical Company
[1]Cobalt naphthenate solution-6 percent in mineral spirits
[2]DMA solution is a 10 percent solution of dimethyl aniline in a phthalate ester
[3]Copper naphthenate solution 8 percent in white mineral spirits
[4]Tert-butyl catechol 10 percent in a phthalate ester
[5]Methyl ethyl ketone peroxide 50 percent by weight in a phthalate ester.

EXAMPLES 11 TO 22

Two resin compositions were prepared as described hereinafter. Resin A was prepared by blending 100 parts by weight of DERAKANE 470-30-S resin with 0.65 parts by weight of a 8 percent by weight copper naphthenate in a mineral spirit solution, 0.2 parts of acetyl acetone, and a portion of a 10 percent by weight solution of tert-butyl catechol in a phthalate ester. 100 grams of Resin A and as a comparison 100 grams of DERAKANE 470-30-S without the copper solution and acetyl acetone were contacted with a catalyst composition comprising 1.0 parts of a 10 percent dimethyl amine in phthalate ester solution, 1.5 parts of methyl ethyl ketone peroxide, 50 percent in a phthalate ester, and 0.3 parts of 6 percent cobalt naphthenate in white mineral spirits.

Resin B was prepared by blending 100 parts of DERAKANE 411-45 epoxy vinylester resin with 0.2 parts by weight of an 8 percent copper naphthenate in a mineral spirit solution, 0.1 parts of acetyl acetone, and varying amounts of 10 percent tertiary butyl catechol solution in a phthalate ester.

100 grams of Resin B, and as a comparison 100 grams of DERAKANE 411-45 epoxy vinylester resin alone, were contacted with a catalyst composition comprising 0.2 parts of a cobalt naphthenate solution, 6 percent in white mineral spirits, 1.2 parts of a 10 percent dimethyl amine in phthalate ester solution and 1.5 parts by weight of methyl ethyl ketone peroxide and 50 percent by weight in a phthalate ester.

The resin mixtures described were allowed to cure and the gel time, time to peak exotherm and peak exotherm temperatures were determined. The amount of tertiary butyl catechol solution, gel time, peak exotherm and time to peak exotherm are compiled in Table 2.

TABLE 2

| Component/Example | 11** | 12** | 13** | 14** | 15 | 16 | 17** | 18** | 19** | 20** | 21 | 22 |
|---|---|---|---|---|---|---|---|---|---|---|---|---|
| DERAKANE* 470–30 | 100 | 100 | 100 | | | | | | | | | |
| Resin A | | | | 100 | 100 | 100 | | | | | | |
| DERAKANE* 411–45 | | | | | | | 100 | 100 | 100 | | | |
| Resin B | | | | | | | | | | 100 | 100 | 100 |
| Tertiary butyl catechol solution 10% | 0 | 0.25 | 0.5 | 0 | 0.25 | 0.5 | 0 | 0.25 | 0.5 | 0 | 0.25 | 0.5 |
| Gel time (min) | 8.5 | 14.1 | 23.8 | 34 | 67 | 123 | 25 | 35 | 100 | 50 | 130 | 200 |
| Time to peak (min) | 45 | 57 | 140 | 85 | 190 | 270 | 12.5 | 17.6 | 28.2 | 55 | 92 | 166 |
| Peak exotherm ° C. | 180 | 180 | 165 | 68 | 65 | 52 | 202 | 210 | 203 | 77 | 62 | 43 |
| Heat distr. temperature | | | | | | | | | | | | |
| after 16 hrs 20° C. | 57 | 51.9 | 62 | 58 | 51.6 | | 44 | 40 | 44 | 46 | 39 | 42 |
| after 2 hrs 80° C. | 101 | 104 | 100 | 99 | 102 | 46 | 94 | 101 | 94 | 97 | 99 | 93 |
| after 3 hrs 100° C. | 118 | 119 | 118 | 116 | 118 | 82 | 109 | 109 | 109 | 107 | 110 | 107 |
| Residual styrene % | | | | | | | | | | | | |
| after 16 hrs 20° C. | 0.16 | 4.13 | 0.16 | 5.07 | 7.2 | 7.8 | 10.75 | 12.55 | 11.56 | 9.75 | 13.31 | 12.23 |
| after 3 hrs 80° C. | 0.10 | 0.35 | 0.15 | 0.20 | 0.40 | 0.37 | 2.07 | 1.53 | 2.40 | 1.33 | 1.11 | 2.68 |
| after 3 hrs 100° C. | | | | | | | 0.37 | 0.34 | 0.43 | 0.19 | 0.19 | 0.51 |

*Trademark of The Dow Chemical Company
** not an Example of the invention

Table 1 Examples 1 to 3 and 6 to 8 demonstrate that the addition of acetyl acetone alone results in an increased gel time and higher peak exotherm. Examples 1, 4 and 5 and 6, 9 and 10 demonstrate that tert-butyl catechol lengthens the gel time and lowers the peak exotherm below 50° C. A peak exotherm below 50° C. normally indicates insufficient energy is released to sustain the reaction.

Table 2 demonstrates that the use of the catalyzed resin system of the invention allows extension of the gel time while maintaining a controllable exotherm which does not create significant heat induced cracks due to stress. Additionally the use of such a system results in cured products with good heat distortion and residual styrene levels.

What is claimed is:
1. A curable resin composition comprising
   A. an epoxy vinylester resin;
   B. a polymerizable monomer;
   C. a chelating agent;
   D. a copper salt or complex of copper with an alcohol, aldehyde or ketone; and
   E. an inhibitor comprising alkylated phenolic compound or polyhydroxy aromatic compound.
2. A curable resin composition according to claim 1 comprising
   A. 100 parts by weight of the epoxy vinylester resin;
   B. from 20 to 60 parts by weight of the polymerizable monomer;
   C. from 100 to 10,000 parts per million by weight, based on the whole composition (hereinafter "ppm") of the chelating agent;
   D. from 1 to 100 ppm of the copper salt or copper complex; and
   E. from 10 to 1000 ppm of an inhibitor.
3. A composition as claimed in claim 1 or claim 2, wherein component D is a copper salt of a carboxylic acid.
4. A two part curable resin system comprising
   I. A resin component comprising components A, B, C, D and E, as defined in claim 1 or claim 2; and
   II. a catalyst system which comprises
      E. optionally an additional amount of component E as defined in any one of claims 1 or 2;
      F. optionally an aliphatic amine, an aromatic amine, or a heterocyclic amine;
      G. an initiator which is a peroxide or persulphate, and;
      H. an accelerator which is a transition metal compound of cobalt or vanadium.
5. A curable resin system according to claim 4, wherein the amounts of components F, G, and H which are employed are respectively:
   F. from 0 to 50,000 ppm;
   G. from 110 ppm to 50,000 ppm; and
   H. from 30 to 1000 ppm.
6. A method for preparing a cured resin composition which comprises contacting the resin composition (I) as defined in claim 4 with a catalytic amount of the catalyst composition (II) as defined in claim 4, optionally contacting the mixture with a reinforcing structure, and allowing the composition to cure under conditions such that the peak exotherm is from 40° C. to 120° C. and the cure time is form 30 to 120 minutes.
7. A two part curable resin system according to claim 4 comprising
   I. a curable resin comprising
      A. 100 parts by weight of the epoxy vinylester resin;
      B. from 20 to 60 parts by weight of the polymerizable monomer;
      C. from 100 to 10,000 ppm of the chelating agent;
      D. from 1 to 100 ppm of the copper salt or copper complex; and
      E. from 10 to 1000 ppm of an inhibitor; and
   II. a catalyst system which comprises
      E. optionally an additional amount of component E;
      F. optionally an aliphatic amine, an aromatic amine, or a heterocyclic amine;

G. an initiator which is a peroxide or persulphate, and;

H. an accelerator which is a transition metal compound.

8. A curable resin system according to claim 4, wherein the amounts of components (F), (G) and (H) which are employed are respectively:

F. from 0 to 50,000 ppm;

G. from 110 to 50,000 ppm; and

H. from 30 to 1000 ppm.

9. A curable resin system according to claim 7, wherein the amounts of components (F), (G) and (H) which are employed are respectively:

F. from 0 to 50,000 ppm;

G. from 110 to 50,000 ppm; and

H. from 30 to 1000 ppm.

* * * * *